C. H. LOHMANN.
BUTT ADJUSTER FOR HARVESTERS.
APPLICATION FILED JAN. 12, 1914.
1,260,410.
Patented Mar. 26, 1918.
2 SHEETS—SHEET 1.
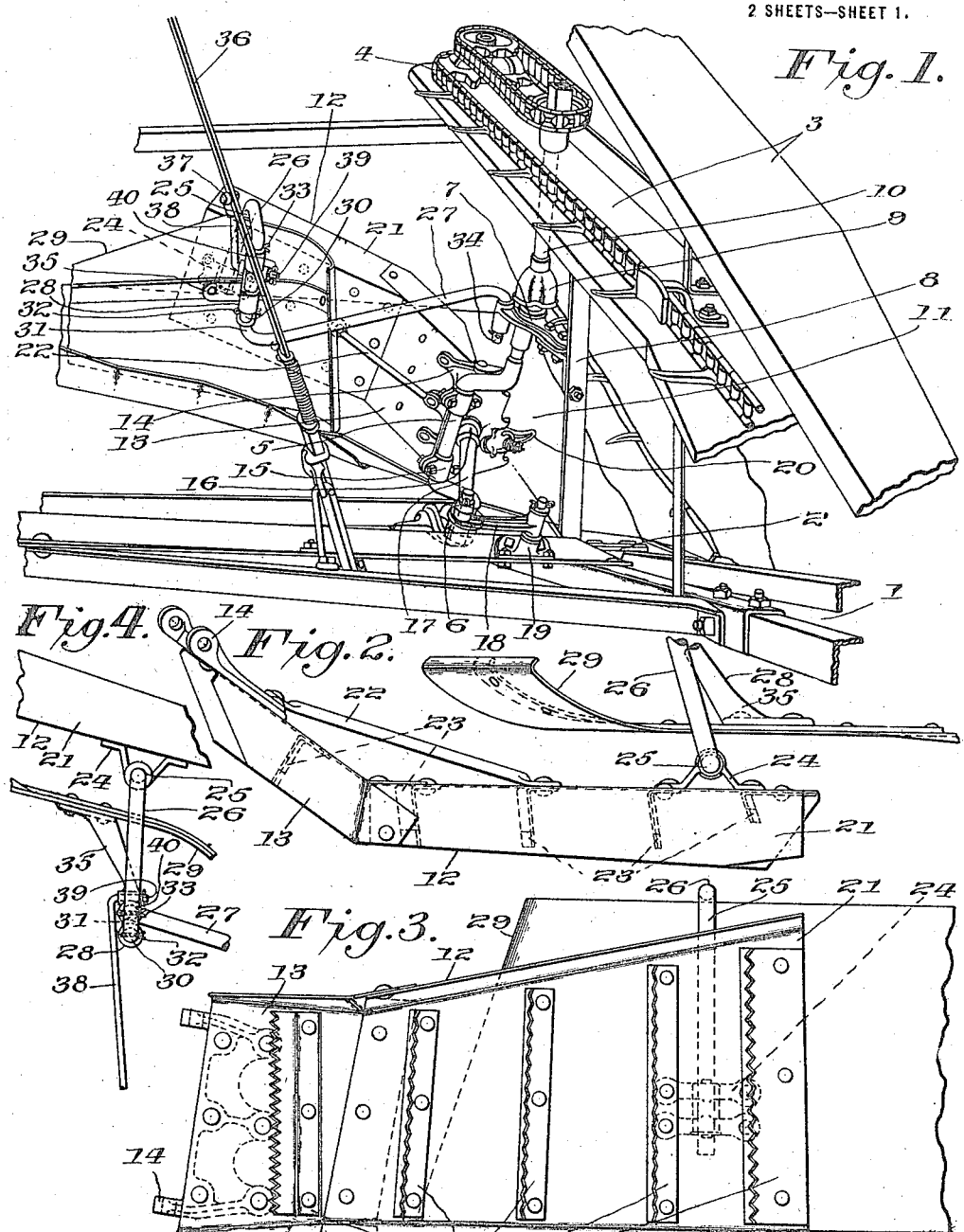
Witnesses:
C. C. Palmer
E. W. Burgess
Inventor:
Carl H. Lohmann,
By Chas. E. Lord
Atty.

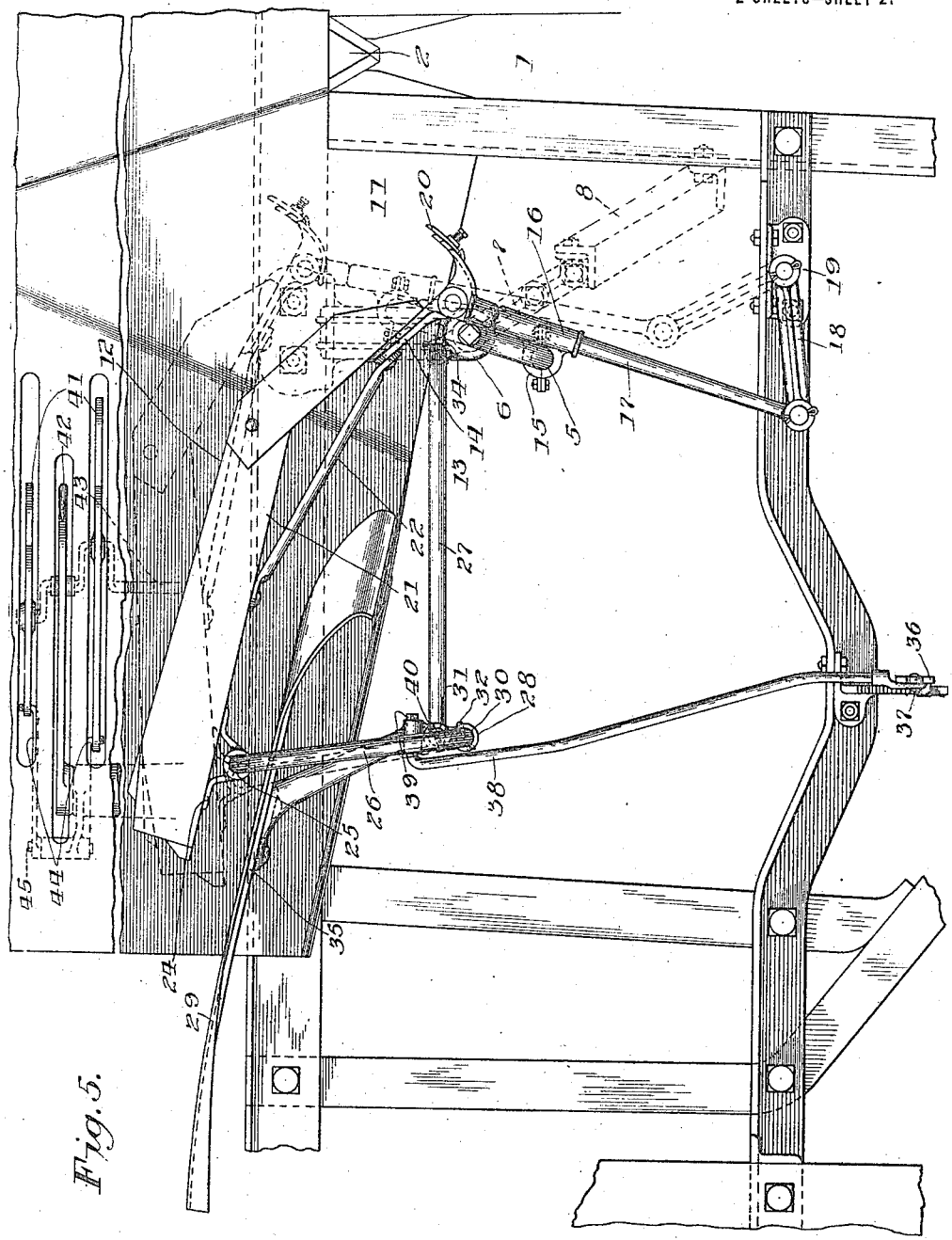

UNITED STATES PATENT OFFICE.

CARL H. LOHMANN, OF GUYMON, OKLAHOMA, ASSIGNOR TO INTERNATIONAL HARVESTER COMPANY OF NEW JERSEY, A CORPORATION OF NEW JERSEY.

BUTT-ADJUSTER FOR HARVESTERS.

1,260,410.

Specification of Letters Patent. Patented Mar. 26, 1918.

Application filed January 12, 1914. Serial No. 811,560.

*To all whom it may concern:*

Be it known that I, CARL H. LOHMANN, a citizen of the United States, residing at Guymon, in the county of Texas and State of Oklahoma, have invented certain new and useful Improvements in Butt-Adjusters for Harvesters, of which the following is a full, clear, and exact specification.

This invention relates to butt adjusters for harvesters, and is designed particularly for use in connection with machines for cutting and binding corn, having the general form shown and described in Patent No. 640,046, December 26, 1899, John A. Stone, corn harvester. The invention comprises improvements in butt adjusting mechanism as applied to this machine, which will be hereinafter pointed out.

The object of my invention is to provide a butt adjusting mechanism having greater efficiency in harvesting short corn or feed. This object is attained by means of the mechanism illustrated by the accompanying drawing, in which—

Figure 1 is a front elevation in perspective of part of a corn harvester having my invention embodied in its construction;

Fig. 2 is a top plan view of part of the butter mechanism on an enlarged scale;

Fig. 3 is a side elevation of Fig. 2; and

Fig. 4 is a detail plan view of a portion of the mechanism.

Fig. 5 is a top plan view of a portion of a corn harvester illustrating the butt adjuster and a portion of the binder deck, with the packer arms and binding needle thereon.

Referring to the drawings, wherein like reference numerals denote the same parts throughout the several views, 1 represents a passageway for the corn leading to a cutting apparatus 2, 3 gathering boards, and 4 the conveying chains mounted upon the boards and deriving motion from a traction wheel in substantially the same manner as described in the above noted patent, 5 represents a crank shaft having its lower end journaled in a bearing box 6 secured to the frame of the machine, and its upper end in a bearing box 7 secured to a vertical frame member 8; the upper end of the crank shaft being connected, by means of a universal coupling 9, with the lower end of a shaft 10 that derives motion from one of the conveying chains 4, 11 a binder deck leading toward the binding mechanism (not shown), and 12 represents a butt adjusting member disposed vertically relative to said deck, and comprising a forwardly inclined portion 13 having its lower end adjacent the deck 11 and having a bracket 14 secured to its front end whereby it is pivotally connected with a bearing box 15 journaled upon the crank shaft 5, and including an angularly disposed sleeve member 16 received by one end of a controlling bar 17, the opposite end of the bar being pivotally connected with one end of an arm 18, having its opposite end pivotally connected with a fixed part 19 of the frame of the machine; and 20 represents a yielding stalk engaging finger carried by the front end of the part 13. The part 13 is rigidly secured to a laterally extending member 21, and 22 represents a brace member connecting the two parts. The upper parts of the members 13 and 21 are turned inward, and 23 represents stalk engaging cleats vertically disposed and secured to the operative side of the two parts in spaced relation. 24 represents a bearing bracket secured to one end of the part 21, upon its front side, whereby it is pivotally connected with a vertically disposed part 25 at one side of a two-part swinging adjuster supporting rod 26, 27. As shown, the two parts of this rod are independently pivoted to a bearing bracket 28 (Fig. 4) fixed to the front of a butter extension 29, the adjacent ends of the rods 26 and 27 being provided with oppositely disposed extensions 30 and 31, journaled in this bearing and positioned with respect thereto by suitable means, such as cotter pins 32, 33. The opposite end of the rod 27 is provided with a downwardly disposed extension 34 pivotally connected, as shown, to the bearing box 7, while the butter extension 29 is disposed in front of the part 21 and is secured to a rearwardly extending arm 35 on the casting 28. 36 represents a hand lever mechanism whereby the butt adjuster may be adjusted in a fore and aft direction as desired. As shown, this mechanism is carried by the frame of the machine and is pivotally connected at 37 with a rearwardly extending link 38 having on its rear end a laterally disposed extension 39 disposed substantially at right angles to the extensions 30 and 31 on the rods 26 and 27, and likewise journaled in the bracket 28 and positioned with respect thereto by any suitable means, such as a cotter pin 40. In Fig.

I have illustrated a portion of the binder deck, with the packer arms and binding needle thereon, the packer arms 41 being supported and actuated by crank shaft 43, the ends of these arms being provided with the usual links 44 pivoted on a stub shaft 45. The binding needle 42 is supported in the usual manner and has not been illustrated in detail. From an inspection of the construction shown in this figure it will be clear that the butt adjuster 12 receives the stalks directly from the cutting mechanism and squares the butts before they have been acted upon by the packer arms. This is an important feature of my device, since it is practically impossible to square the butts after the packer arms have come into action and have compressed the stalks.

In operation the adjuster moves in an orbital path as controlled by the crank shaft 5 and supporting rods 26 and 27, and the angularly disposed part 13 thereof engages with the sides of the upright stalks immediately after they have been cut to move them from the cutting apparatus in an aggressive manner and advances them toward the part 21 in a manner which effectually prevents choking adjacent the cutting apparatus. The part 21 engages the circular cut ends of the stalks to further progressively move the stalks. These two angularly arranged portions not only prevent choking but also insure the binding of the stalks even when the stalks being handled are very short.

While I have in this disclosure of my invention specifically described but one form thereof, it is, of course, to be understood that the same is not limited to the form chosen for purposes of illustration but may be embodied in modified forms without departing from its spirit.

What I claim as my invention is:

1. In a corn harvester, a frame, cutting mechanism thereon, a crank shaft, a binder deck, a two-part butt adjuster operatively located above said deck in the path of the corn and adjacent said cutting mechanism, one of said parts engaging the sides of the stalks to move the same away from the cutting mechanism, the other part engaging the ends only of the stalks in a further progressive movement, both parts of said butt adjuster being operated from said crank shaft.

2. In a corn harvester, a frame, cutting mechanism thereon, a binder deck, a butt adjuster operatively located above said deck in the path of the corn and adjacent the cutting mechanism, said butt adjuster including two parts at an angle and rigid with respect to each other to act upon the side and end successively of the butt portion of a stalk.

3. In a machine of the class described, in combination, a cutting apparatus, a binder deck, a substantially vertical rotatable crank shaft located in rear and at one side of said cutting apparatus, and a butt adjuster adjacent said cutting apparatus disposed vertically relative to said binder deck and having its lower front end operatively connected with said crank shaft and inclined rearward and laterally therefrom, and the rear end of said butt adjuster inclined from and rigid with the front end, and means for controlling the rear end of said butt adjuster.

4. In a machine of the class described, in combination, a cutting apparatus, a binder deck, a substantially vertical rotatable crank shaft located in rear and at one side of said cutting apparatus, and a butt adjuster adjacent said cutting apparatus disposed vertically relative to said binder deck and operatively connected with said crank shaft, the operative portions of said adjuster being divided into two connected parts arranged at different angles relative to each other and both operated from said crank shaft.

5. In a machine of the class described, the combination of cutting mechanism, a crank shaft, a butt adjuster adjacent the cutting mechanism operatively connected to the crank shaft and having angularly disposed working faces, one of which acts on the stalks in an upright position and the other of which acts upon the stalks when they are prostrate, both parts of said butt adjuster being operated from said crank shaft.

6. In a machine of the class described, the combination of cutting mechanism, a crank shaft, a butt adjuster adjacent said cutting mechanism operatively connected to the crank shaft, said adjuster having two adjacent operative portions for engagement with the stalks at different angles, said adjacent portions being rigid with respect to each other, a brace member connecting the angularly disposed portions, and means for controlling the rear end of said butt adjuster.

7. In a machine of the class described, the combination of cutting mechanism, and a butt adjuster having angularly disposed working faces relatively fixed to each other, one for moving the stalks away from the cutting mechanism by engagement with the side of the stalks and the other for further progressively moving the stalks by engaging their ends.

In testimony whereof I affix my signature, in the presence of two witnesses.

CARL H. LOHMANN.

Witnesses:
J. E. CAMERON,
C. E. WILSON.